United States Patent

Schmidt

(10) Patent No.: US 6,517,903 B1
(45) Date of Patent: Feb. 11, 2003

(54) PROCESS FOR VACUUM COATING EXTRUDED MATERIAL

(75) Inventor: Siegfried Schmidt, Verden (DE)

(73) Assignee: Masterfoods GmbH, Verden (DE)

( * ) Notice: Subject to any disclaimer, the term of this patent is extended or adjusted under 35 U.S.C. 154(b) by 0 days.

(21) Appl. No.: 09/857,499

(22) PCT Filed: Dec. 7, 1999

(86) PCT No.: PCT/DE99/03973
§ 371 (c)(1),
(2), (4) Date: Jul. 24, 2001

(87) PCT Pub. No.: WO00/33674
PCT Pub. Date: Jun. 15, 2000

(30) Foreign Application Priority Data

Dec. 9, 1998 (DE) .......................... 198 56 680

(51) Int. Cl.⁷ .............................. B05D 3/00; A23K 1/00; A23P 1/12
(52) U.S. Cl. .................. 427/294; 427/212; 426/281; 426/302; 426/805
(58) Field of Search ............... 427/294, 212, 427/445; 426/302, 305, 805, 807, 281

(56) References Cited

U.S. PATENT DOCUMENTS

| 4,251,558 A | 2/1981 | Kobayashi et al. ......... 426/473 |
| 4,371,556 A | 2/1983 | Pitchon et al. ............ 426/311 |
| 4,861,606 A | 8/1989 | Jensen ..................... 426/305 |
| 4,971,820 A * | 11/1990 | Likuski et al. ........... 426/281 |
| 5,125,168 A * | 6/1992 | Aigeldinger ................ 34/92 |
| 5,716,655 A | 2/1998 | Hamstra et al. ............. 426/63 |

FOREIGN PATENT DOCUMENTS

| EP | 406 650 A2 | 1/1991 | |
| EP | 0 927 522 A1 * | 7/1999 | .......... A23N/17/00 |
| GB | 2 324 701 | 11/1998 | |
| JP | 2138944 | 5/1990 | |
| WO | 98/03080 | 1/1998 | |
| WO | 98/09542 | 3/1998 | |
| WO | WO 98/09542 * | 3/1998 | .......... A23N/17/00 |
| WO | 98/49904 | 11/1998 | |

* cited by examiner

*Primary Examiner*—Shrive P. Beck
*Assistant Examiner*—William Phillip Fletcher, III
(74) *Attorney, Agent, or Firm*—Leonard J. Santisi

(57) ABSTRACT

Process for the vacuum coating of an extruded material, particularly animal food, in which the extruded material is coated with a flowable coating material during a vacuum phase and under reduced pressure, characterized in that the extruded material, during the vacuum phase, is initially dried and then coated with the coating material.

11 Claims, 3 Drawing Sheets

(PIROR ART)

PROCESS FOR VACUUM COATING EXTRUDED MATERIAL

BACKGROUND OF THE INVENTION

The invention relates to a process for the vacuum coating of an extruded material, particularly an animal food, in which the extruded material is coated with a flowable coating material during a vacuum phase and under reduced pressure.

For manufacturing and product-related reasons, in the case of numerous extruded products, particularly in the human and animal food sector, the need exists not to have certain constituents of the of the finished and product, e.g. fatty substances in the mixture to be extruded, but to add the same only following the extrusion process, so that an extruded product serves as a carrier for the substance to be subsequently applied.

A known procedure consists of providing a product, which can be porous after extrusion, with desired constituents. The extrusion product is initially dried and then exposed to a vacuum and is coated under reduced pressure with a coating material, which has a flowable consistency. At the end of the vacuum phase the increasing pressure forces the coating material into any existing pores of the extruded material, so that the latter has an increased content of e.g., fat, without the latter being preponderantly located on the surface and leading to an excessive stickiness of the product. The porous, extruded product consequently in part mainly serves as a carrier for the flowable material to be added. In this way, at a vacuum of e.g., 200 mbar, fat contents of up to 30 wt. % are obtained in the end product.

It is a disadvantage of this proven coating process that the total costs for drying and coating are high and also the absorptivity of the extruded product for a coating material is not always adequate, even when using vacuum.

The problem of the present invention is to improve the known coating process in this connection, i.e., in particular to lower the drying costs and also bring about increased productivity for the coating material.

SUMMARY OF THE INVENTION

According to the invention, this problem is solved by a process for the vacuum coating of an extruded material, particularly animal food, in which the extruded material is coated with a flowable coating material during a vacuum phase and under reduced pressure. The extruded material, during the vacuum phase, is initially dried and then coated with the coating material. The drying of the extruded material during, instead of before, the vacuum phase surprisingly leads to several advantages. Firstly, the already porous, extruded material expands further as a result of the evaporation of water during the vacuum phase, so that pores are produced or the pore volume is increased and a correspondingly increased absorptivity for flowable coating material is obtained. In addition, in the case of a vacuum, the drying process can be much better controlled than e.g., drying in hot air, because under reduced pressure there is an evaporation of the inwardly located material areas, which would otherwise not be accessible to contact with drying air. As a result smaller local fluctuations of the moisture content of the product occur, so that the mean moisture content can be raised approximately 1%, which is obviously associated with a considerable cost saving. As a result of the extraction of heat in the drying process the extruded product is simultaneously cooled, so that there is no need for a separate cooling of the material leaving the extruder at a temperature of approximately 100° C.

The coating material can contain fat and/or water.

Preferably, the extruded material is porous and expands during the vacuum phase.

Preferably, at the start of the vacuum phase the extruded material has a temperature higher than 90° C.

According to a preferred embodiment, at the start of the vacuum phase, the extruded material has a moisture content, related to its dry, weight, of no more than 25 wt. %.

According to an embodiment of the invention, during the vacuum phase, the moisture content of the extruded material is lowered by 6 wt. %, based on the dry weight.

Prior to the start of the vacuum phase, the extruded material can be predried at normal pressure.

Preferably, after drying and coating, the extruded material has a final moisture content of 9 wt. %, based on its dry weight. After drying and coating, the extruded material preferably has a temperature of 25° C.

During the vacuum phase the pressure can be lowered to 200 mbar.

According to an embodiment, at the start of the vacuum phase the pressure is lowered to 40 mbar. The pressure can be kept at 40 mbar until the extruded material reaches a temperature of 30° C. or lower.

The vacuum phase can last up to 5 minutes.

During the vacuum phase, it is possible to supply additional energy, particularly in the form of infrared or microwave radiation.

BRIEF DESCRIPTION OF THE DRAWING

Further advantages and features of the invention can be gathered from the following description of preferred embodiments with reference to the attached drawings, wherein.

DESCRIPTION OF A PREFERRED EMBODIMENT

Figure 2:
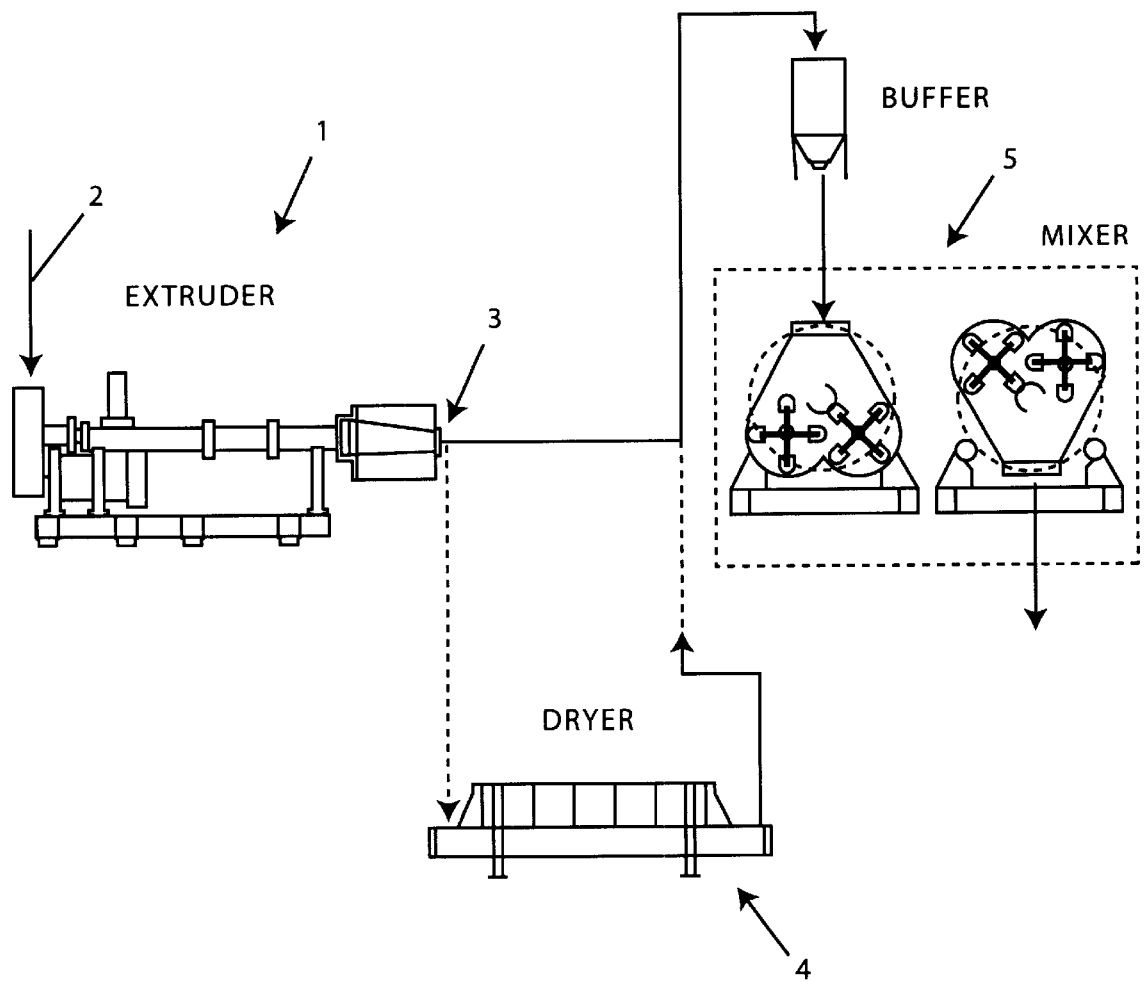
FIG. 2 Shows an arrangement for performing the process according to the invention.
Figure 3:
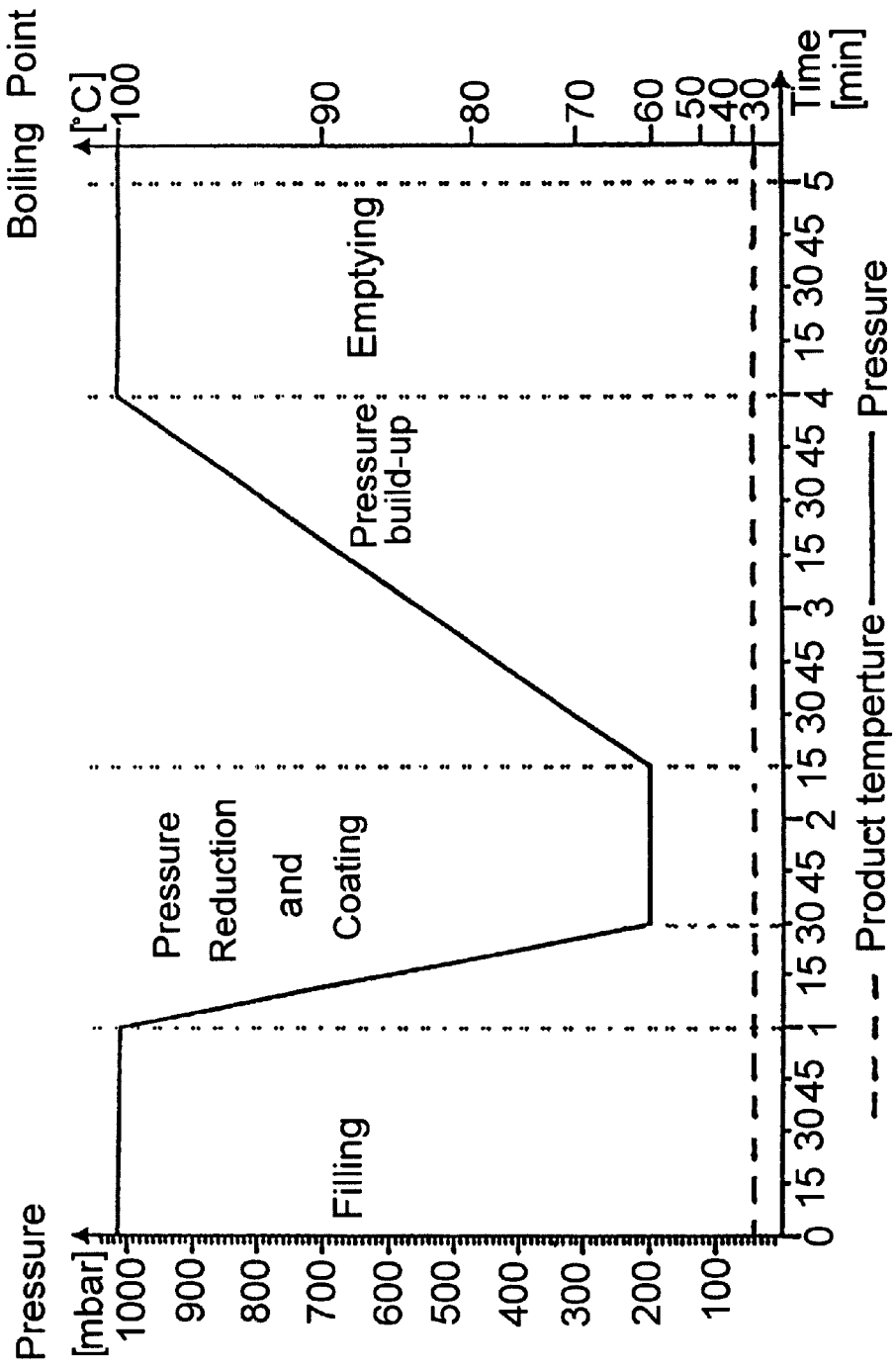
FIG. 3 Is a similar representation to FIG. 1 of time behavior of product temperature and pressure in a prior art process.

Reference is first made to FIGS. 2 and 3 in order to illustrate the known procedure. A mixture to be extruded passes into the extruder 1, arrow 2, and leaves it at its discharge opening 3 at a temperature of approximately 100° C. Based on the dry weight of the extruded product, the moisture content at this point is approximately 25%. The extruded product is then dried in a drier 4. After coating in a mixer 5, it has a moisture content, based on the dry substance, of 9 wt. % and a temperature of 25° C. The moisture content obtained at the drier outlet is dependent on the particular coating material used for coating the extruded material in the mixer 5, i.e., on its water content. For example, when coating with an aqueous coating material a moisture content of 6 wt. % may be necessary at the drier outlet, in order to arrive at a final moisture content of 9 wt. %. Conversely, when coating with a coating material containing little or no water, e.g., a fatty substance, it may be possible to obtain a higher moisture content than 9% at the outlet of the drier 4 or on entering the mixer 5. This is so because the moisture percentage, based on the dry weight, decreases when an anhydrous substance is applied.

FIG. 3 illustrates the time sequence of the processes during vacuum coating within the mixer 5 in accordance with the prior art. Extruded, dried, porous material cooled to approximately 30° C. (below 50° C.) is filled, under ambient pressure, into mixer 5, whose charging opening is directed upwards (left-hand mixer representation in FIG. 2). The filling opening is closed and the internal pressure is lowered within a relatively short time of approximately 1.5 minutes to approximately 200 mbar. Previously, subsequently or simultaneously, coating material is fed into the mixer and the extruded materials is mixed therewith. The pressure in the mixer is then increased again to ambient pressure so that the coating material is forced deeply into the porous cavities of the extruded material. As shown in FIG. 3, throughout the process the product temperature remains almost unchanged at approximately 30° C., which corresponds to the filling or charging temperature.

Figure 1:
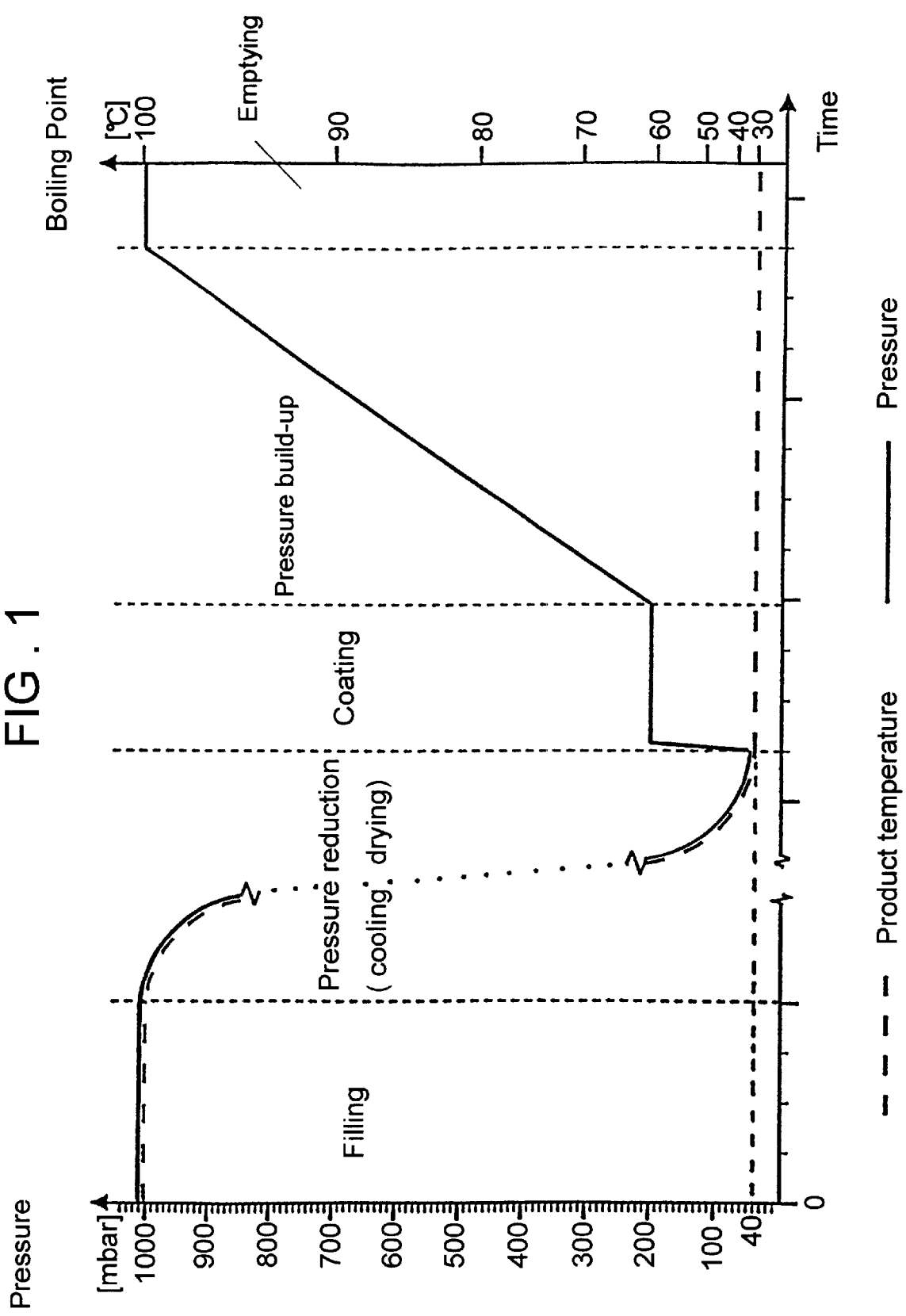
FIG. 1 Is a graph of the time behavior of product temperature and pressure in an embodiment of the process according to the invention.

Compared to this prior art, the process according to the invention differs in that the extruded product, which leaves the extruder 1 at its discharge opening with a temperature of approximately 100° C., is initially not cooled and is passed into the mixer 5 at approximately 95° C. As a result of the unavoidable transporting path the extruded product temperature decreases by approximately 5° C. This is further illustrated in FIG. 1, which in similar manner to FIG. 3 shows the time behavior of the product temperature and pressure during the coating and mixing process. It is also pointed out that on the right-hand side of FIGS. 1 and 3 is plotted the boiling point of water, which corresponds to the pressure on the left. Thus, 200 mbar correspond to a boiling point of approximately 60° C. and 40 mbar to approximately 30° C., etc.

The extruded, porous material passes more or less directly out of the extruder into the mixer, the temperature being almost 100° C. After closing the mixer, the pressure is lowered to approximately 200 mbar, or as shown in FIG. 1, even to 40 mbar. As a result of the boiling point reduction and the evaporation of the water contained in the extruded material associated therewith, there is a considerable cooling. After the pressure, whose time behavior is not precisely shown in FIG. 1, has reached its lowest point of approximately 40 mbar or has stayed for a certain time at this value a moisture content of 19 wt. % still exists. As an example, if in the extruded material at approximately 100° C. there was a moisture content of 25 wt. %, following cooling to 30° C. (boiling point at 40 mbar) as a result of the "vacuum drying" there is a moisture content decrease of 6 wt. % accompanied by a simultaneous cooling to 30° C.

Following such a cooling and drying coating takes places with a desired material, together with a pressure rise to approximately 200 mbar, the product temperature still being 30° C. This and the emptying of the mixing vessel (right-hand mixer representation in FIG. 2) substantially correspond to the prior art procedure.

The time pressure distribution, only intimated in FIG. 1, on reducing pressure from ambient pressure to 40 mbar, or at least 200 mbar, is inter alia dependent on the moisture content with which the extruded material is introduced into the mixer and to what extent drying is to take place, i.e., what type of coating (aqueous or anhydrous) is used for coating purposes. The expanding behavior of the extruded material can also be influenced by the speed of the pressure drop.

Under the basic assumption that in a specific process sequence in the vacuum phase in the mixer there is always a moisture content reduction by 6 wt. %, without the temperature dropping below 25 to 30° C., e.g., the following process alternatives are also possible:

1. Extruded material entering the mixer at 16 wt. % moisture and 95° C., following a pressure drop to 50 mbar, after a certain time, reaches a moisture content of 10 wt. % and a temperature of 25° C. After coating with a fat-containing coating material containing little or no water the desired moisture content of 9 wt. % is reached. The delivery temperature is in unchanged form 25° C.

2. If the moisture content of the extruded material is higher, it is either necessary to operate with an external energy supply during the vacuum phase or with pre-drying before the vacuum phase.

If the moisture content of the extruded material is e.g., 25% and coating is to take place with an aqueous material, the extruded material can initially be predried (at 95° C.) to 12 wt. %, before being dried according to the invention during the pressure reduction to 40 mbar to 6 wt. % moisture and 25° C. By coating with aqueous material 9 wt. % moisture at 25° C. is obtained.

Alternatively a drying to a higher moisture content, e.g., 16 wt. %, would be adequate, if coating takes place with a material containing little or no water. Then, in the mixer, on reducing the pressure, there is e.g., a 10 wt. % moisture content and a temperature of 25° C. and after fat coating 9 wt. % moisture at 25° C.

When operating with an initial moisture content of 25 wt. %, without pre-drying, energy must be supplied during the vacuum phase, particularly in the form of microwave heating. As a result the desired values of e.g., 6 wt. % moisture at 25° C. are obtained prior to coating.

As in the case of vacuum drying there are scarcely any local fluctuations of the moisture content or peak values, a very precise moisture setting occurs, so that the mean value of the moisture content can be raised by approximately 1 wt. % compared with the known procedure using a hot air drier. This is not altered by the fact that in certain cases, according to the invention, it may be appropriate to use a (hot air) predrier, because this merely lowers the overall moisture content prior to the actual drying stage, whereas the actual "fine setting" takes place during the vacuum phase. Considerable energy savings result from this.

As a result of the time control of the pressure reduction or distribution, it is possible to influence whether or not the extruded product is to be further expanded. It can be appropriate in some cases to solidify the extruded product in a predrier to such an extent that it does not excessively stick.

The features of the invention disclosed in the description, drawings and claims can be essential to the implementation of the different embodiments of the invention, either singly or in the form of random combinations.

What is claimed is:

1. A process for the vacuum coating of an extruded material in which the extruded material is coated with a flowable coating material during a vacuum phase under reduced pressure wherein the extruded material is initially dried and then coated with the coating material and wherein the pressure at the start of the vacuum phase is lowered to 40 millibar and during the vacuum phase the pressure is raised to 200 millibar.

2. A process for the vacuum coating of an extruded material in which the extruded material is coated with a flowable coating material during a vacuum phase under reduced pressure wherein the extruded material is initially dried and then coated with the coating material and wherein during the vacuum phase the pressure is lowered to 200 millibar and then lowered to 40 millibar and wherein the pressure of 40 millibar is maintained until the extruded material has reached a temperature of 30° C. or lower.

3. A process according to claim 1 or 2 wherein the coating material contains fat and/or water.

4. A process according to claim 1 or 2 wherein the extruded material is porous and expands during the vacuum phase.

5. A process according to claim 1 or 2 wherein at the start of the vacuum phase the extruded material has a temperature of more than 90° C.

6. A process according to claim 1 or 2 wherein at the start of the vacuum phase the extruded material has a moisture content of no more than 25 wt. % based on its dry weight.

7. A process according to claim 1 or 2 wherein the moisture content of the extruded material is lowered by 6 wt. % based on its dry weight during the vacuum phase.

8. A process according to claim 1 or 2 wherein prior to the start of the vacuum phase the extruded material is predried at normal pressure.

9. A process according to claim 1 or 2 wherein after drying and coating the extruded material has a final moisture content of 9 wt. % based on its dry weight.

10. A process according to claim 1 or 2 wherein after drying and coating the extruded material has a temperature of 25° C.

11. A process according to claim 1 or 2 wherein during the vacuum phase additional energy is supplied in the form of microwave energy.

* * * * *